United States Patent Office 3,423,342
Patented Jan. 21, 1969

3,423,342
ADHESIVE MASS SUBSTANTIALLY FREE OF SURFACE TACK
Edward R. Kendall, Geneva, Ill., assignor to Simoniz Company, a corporation of Delaware
No Drawing. Continuation-in-part of application Ser. No. 411,113, Nov. 13, 1964. This application Sept. 16, 1965, Ser. No. 487,916
U.S. Cl. 260—22                        6 Claims
Int. Cl. C08h 11/06; C09j 3/26

ABSTRACT OF THE DISCLOSURE

A solid adhesive mass essentially free of surface tack but capable of transfer of an adhesive film to a substrate by friction rubbing of the mass on the substrate in which the composition is essentially free of solvent and consists essentially of a substantially homogeneous blend of 53-75 parts of a tack promoting rosin derivative which may be either hydrogenated wood rosin or glycerol esters thereof or glycerol esters of wood rosin, about 10-33 parts of a copolymer of ethylene and vinyl acetate, from a small but effective amount for making the mass substantially free of surface tack up to about 5 parts of paraffin wax and from a small but effective amount for friction deposition of the film up to about 25 parts of a plasticizer of the class consisting of oil modified sebacic acid alkyd, sebacic acid alkyd and oil modified dibasic acid alkyd plasticizing resins.

---

This invention is a continuation-in-part of my copending application Ser. No. 411,113, filed Nov. 13, 1964, now abandoned.

The adhesive of this invention is essentially free of surface tack but capable of transfer of an adhesive film to a substrate by friction rubbing of the mass on the substrate. It appears that the frictional heat causes transfer of a film of the adhesive solid to the substrate and that this film is extremely adhesive so that when another object, such as a second paper sheet, is pressed against it the film will form a tenacious bond.

One of the features of this invention is to provide a solid adhesive mass of the above-described characteristics.

Other features and advantages of the invention will be apparent from the following description of the invention and certain embodiments thereof.

The solid adhesive mass which is essentially free of surface tack consists essentially of a substantially homogeneous blend of hydrogenated wood rosin or a glycerol ester of hydrogenated wood rosin or a glycerol ester of wood rosin, a solid copolymer of ethylene and vinyl acetate, paraffin wax and an oil modified sebacic acid type alkyd resin or a sebacic acid type alkyd resin or an oil modified dibasic acid type alkyd resin as a plasticizer. These ingredients are blended together in effective amounts to produce a solid adhesive mass that is essentially free of surface tack but that is capable of transfer of an adhesive film to a substrate by friction rubbing of the mass on the substrate.

In the adhesive mass of this invention the rosin derivative identified above is present in an amount of about 53-75 parts, the copolymer is present in an amount of about 10-33 parts, the paraffin wax in a maximum amount of about 5 parts down to a small but effective amount for making the entire solid adhesive mass substantially free of surface tack with a practical minimum amount being about 0.5 part, the amount of alkyd resin plasticizer is not greater than about 25 parts down to a small but effective amount for promoting friction deposition of the above film from the mass which is contributed to by the presence of the plasticizer and a practical minimum amount is about 0.5 part, and especially preferably 10.

The solid adhesive of this invention has a number of very important advantages. Thus, the adhesive mass uses no solvents and there is, therefore, no danger of inhaling solvent vapors or excess hardening by the loss of solvent over a period of time or any of the other disadvantages that are present when solvents are used. Also, the adhesive mass itself is free of surface tack yet, when applied in a thin film by friction rubbing of the mass at room temperature on a substrate, the film itself is extremely adhesive. Thus the adhesive mass does not require melting or any other conversion to a liquid for application to a substrate. In addition, the adhesive is stable and is usable over a long period of time without deterioration or substantial change. This is due primarily to the absence of a volatile solvent.

In making the adhesive mass of this invention the ingredients are melted such as by heating in a container to a melting temperature, for example about 140° C., and during heating all materials are thoroughly mixed until they are substantially homogeneous. The melted material blend, which is homogeneous, is then poured into a lined mold and allowed to cool. Such a mold may be lined with parchment treated with liquid dimethylsilicone. The blend cools to a solid mass that is essentially free of surface tack so that it can be easily handled, but a film of this blend can be transferred to a substrate such as paper by rubbing the adhesive mass on the substrate. As pointed out above, the heat of friction of rubbing appears to soften the mass sufficiently for transfer of a film onto the substrate. This film itself is found to be tacky so that it adheres readily to another solid such as another sheet of paper.

The wood rosin derivative may be hydrogenated wood rosin, a glycerol ester of hydrogenated wood rosin or a glycerol ester of wood rosin. Typical rosin derivatives that are usable include "Staybelite Ester No. 10," a glycerol ester of hydrogenated rosin having a softening point of 80-88° C. by the Hercules drop method, an acid number of 10 maximum, a typical acid number being 8, a viscosity (on the Gardner-Holdt scale) at 25° C. of I to M and a specific gravity at 25/25° C. of 1.07. A similar ester is No. 5 which is an especially prepared form of ester No. 10.

Another material is hydrogenated wood rosin known as "Staybelite" having a softening point by the Hercules drop method of 74° C. minimum, for example 75° C., an acid number of 155 minimum, such as 165, a refractive index at 100° C. of 1.5012 maximum, such as 1.5008, a saponification number of 167, 9.3% unsaponifiable material, and a density at 20° C. of 1.045.

Another rosin derivative is the glycerol ester of pale wood rosin known as "Ester Gum 8L" having a softening point by the Hercules drop method of 88-96° C., an acid number of 8 maximum and a viscosity (in the Gardner-Holdt scale) at 25° C. of A to C, and a specific gravity at 25/25° C. of 1.08.

Typical ethylene-vinyl acetate copolymers include "DQDA-7268" containing 72% ethylene and 28% vinyl acetate. It has a ring and ball softening point of 182° F., a density of 0.943 gram per cc., a durometer hardness on the D scale of 20, a tensile strength of 400 p.s.i. and elongation at break of 500%, a brittleness temperature of −38° C. and a refractive index at 25° C. of 1.483. Other copolymers are known as "Elvax Vinyl Resin 240," "Elvax Vinyl Resin 150," "Elvax Vinyl Resin 220," "Elvax Vinyl Resin 250" and "Elvax Vinyl Resin 260."

The "Elvax Vinyl Resin 240" is a solid material and is a copolymer of 72% ethylene and 28% vinyl acetate having a tensile strength of 1000 p.s.i. and a softening point of 255° F. by the ring and ball method.

"Elvax Vinyl Resin 220" is a copolymer of 72% ethylene and 28% vinyl acetate having a tensile strength of 550 p.s.i. and a softening point by ring and ball of 190° F.

"Elvax Vinyl Resin 250" is also a copolymer of 72% ethylene and 28% vinyl acetate having a tensile strength of 2,000 p.s.i. and a softening point by ring and ball of 276° F.

"Elvax Vinyl Resin 260" is also a copolymer of 72% ethylene and 28% vinyl acetate having a tensile strength of 2,900 p.s.i. and a softening point by ring and ball of 310° F.

The "Elvax Vinyl Resin 150" is a copolymer of 67% ethylene and 33% vinyl acetate also having a tensile strength of 1,000 p.s.i. but having a softening point by the ring and ball method of 243° F.

Typical paraffin waxes include paraffin with a melting point of about 135–138° F., "Aristowax" with a melting point of about 143–150° F. and paraffin wax with a melting point of about 160–165° F.

The paraffin wax ingredient contributes toward firmness of the adhesive blend mass and as the amount of paraffin wax is increased the surface tackiness of the mass decreases, both of which contribute to ease of handling.

The plasticizing resins which are used from a small but effective amount for promoting friction deposition of a film rubbed from the adhesive mass of this invention up to about 25 parts are prepared as set forth in Examples 1–9 of U.S. Patent 1,783,167. Typical resins include "Paraplex RG-2-100%" which is an oil modified sebacic acid alkyd resin made from glycerol, sebacic acid, castor oil and linseed oil, "Paraplex RG-10" which is an oil modified dibasic acid type alkyd resin which is similar to the above RG-2 but replaced by an acid of Example 5 of this patent, and "Paraplex G-20" which is an unmodified sebacic acid type alkyd plasticizing resin as made by Example 1 of the above patent. Examples 2 and 3 may be used to produce similar resins.

The rosin derivative is a tack promoting ingredient in the applied film and at the same time contributes to the firmness of the adhesive mass and this firmness increases with increasing amounts of the rosin derivative. At the same time, the surface tack of the mass is decreased.

The ethylene-vinyl acetate copolymer is the basic ingredient as it imparts tackiness to the adhesive mass. It also gives cohesiveness to the applied adhesive film. The firmness of the mass can also be regulated by the amount of copolymer used. Thus, small amounts give a firm mass, while large amounts give a softer mass.

The alkyd resin ingredient functions as a plasticizer and increases the ease of application. It increases the surface tack of the mass and of the applied film with increasing amounts of the resin.

As indicated above, the adhesive mass of this invention must have all ingredients in proper balance in order to make the mass firm enough to retain its shape and to be essentially free of surface tackiness. However, it must be capable of softening with friction rubbing to deposit a layer or film of adhesive on the substrate, such as the sheet of paper, that is to be bonded. Also, a proper balance of ingredients results in an applied film being strong enough so that papers, for example, united by the film cannot be separated without destruction of at least one of the paper bodies.

It has been found that if the mass is made too soft it will not retain its shape during use and the composition of the mass will not transfer to the substrate on rubbing. Conversely, if the mass is made too firm, the adhesive again will not transfer by rubbing the mass across the substrate as previously described.

EXAMPLE 1

In this example 40 grams of "Staybelite Ester No. 10" and 14 grams of "DQDA-7268" were melted together with stirring until they were homogeneous by heating in a beaker to 140° C. After being melted to a homogeneous mixture, the mass was then poured into a mold lined with parchment coated with dimethylsilicone having a viscosity of about 1,000 centistokes at 25° C. After being permitted to cool, it was removed from the mold and was found to be a solid mass without substantial surface tackiness that could be applied to a sheet of paper by friction rubbing.

EXAMPLE 2

In this example the mixture that was heated together to a homogeneous mixture before being poured into the mold consisted of 1 gram of paraffin wax having a melting point of 130–132° F., 40 grams of the above "Staybelite Ester No. 10," 14 grams of the above "DQDA-7268" and 10 grams of "Paraplex RG-2."

EXAMPLE 3

In this example the mixture that was heated together to a homogeneous consistency before being poured into the mold of Example 1, which was the same as the mold of Example 2, consisted of "Eskar Wax R-35"—1 part (1.55%), "Staybelite Ester No. 10"—40 parts (61.54%), "DQDA-7268"—14 parts (21.53%) and "Paraplex RG-2-100"—10 parts (15.38%).

The "Eskar Wax R-35" is a paraffin wax having a blocking point of 101° F. (TAPPI T-652; ASTM-D-1465) by inspection; a tensile strength of 390 p.s.i. (D-1320; T-644); a modulus of rupture of 488 (TAPPI T-655); a sealing strength of 24 g./10 cms. (TAPPI T-642); a penetration (D-1321, T-639) at 77° F. of 14 and at 100° F. of 42; a viscosity (S.S.U. at 310° F.) of 38.6; a melting point (D-87; T-636) of 131.7° F.; an oil content (D-721; T-636) of 0.05%, an API gravity at 180° F. of 52.8; a specific gravity, 60/60, of .847; passes the U.S.P. acid test and passes the peroxide test, 8 hours at 275° F.

The "Paraplex RG-2-100%" is an oil modified sebacic acid alkyd resin. It can be prepared by mixing 46 grams of glycerol, 151.5 grams of sebacic acid, 197.5 grams of castor oil, 49.5 grams of raw linseed oil and heating with stirring at 185–190° C. for 18 hours. Such an alkyd resin may be prepared by the method of Example 4 of U.S. Patent 1,783,167. Other alkyd resins may also be used as, for example, those prepared by Examples 1–3 and 5–9 of this patent.

All parts and percentages herein are by weight.

Having described my invention as related to the embodiments set out herein, it is my intention that the invention be not limited by any of the details of description, unless otherwise specified, but rather be construed broadly within its spirit and scope as set out in the accompanying claims.

I claim:

1. A solid adhesive mass essentially free of surface tack but capable of transfer of an adhesive film to a substrate by friction rubbing of said mass on said substrate, consisting essentially of a substantially homogeneous blend of: about 53–75 parts of a tack promoting member of the class consisting of hydrogenated wood rosin, glycerol esters of hydrogenated wood rosin and glycerol esters of wood rosin; about 10–33 parts of a copolymer of about 67–72% of said copolymer of ethylene and about 33–28% of said copolymer of vinyl acetate; from a small but effective amount for making said mass substantially free of surface tack up to about 5 parts of paraffin wax; and from a small but effective amount for friction deposition of said film up to about 25 parts of a plasticizer of the class consisting of oil modified sebacic acid alkyd, sebacic acid alkyd and oil modified dibasic acid alkyd plasticizing resins, said parts and percentages being by weight.

2. The adhesive mass of claim 1 wherein the amount of said paraffin wax is about 0.5–5 parts.

3. The adhesive mass of claim 1 wherein the amount of said plasticizer is about 0.5–25 parts.

4. The adhesive mass of claim 1 wherein the amount of said plasticizer is about 10–25 parts.

5. The adhesive mass of claim 1 wherein the amount of said paraffin wax is about 0.5–5 parts and the amount of said plasticizer is about 0.5–25 parts.

6. The adhesive mass of claim 5 wherein the amount of said plasticizer is about 10–25 parts.

References Cited

UNITED STATES PATENTS

| | | | |
|---|---|---|---|
| 1,783,167 | 11/1930 | Bruson | 260—22 |
| 2,485,248 | 10/1949 | Watson et al. | 260—27 |
| 2,490,550 | 12/1949 | Sermattei | 260—27 |
| 2,492,760 | 12/1949 | Murphy et al. | 260—27 |
| 2,664,378 | 12/1953 | Heller | 260—27 |
| 3,058,930 | 10/1962 | Samour | 260—27 |
| 3,232,895 | 2/1966 | Klein et al. | 260—27 |

DONALD E. CZAJA, *Primary Examiner.*

R. W. GRIFFIN, *Assistant Examiner.*

U.S. Cl X.R.

260—23, 26, 27, 28, 28.5, 873; 117—122, 155, 158, 167, 168